United States Patent
Tsai et al.

(10) Patent No.: US 9,714,699 B2
(45) Date of Patent: Jul. 25, 2017

(54) HARMONIC DRIVE THAT IMPROVES TRANSMISSION ACCURACY

(71) Applicant: HIWIN TECHNOLOGIES CORP., Taichung (TW)

(72) Inventors: Yi-Hung Tsai, Taichung (TW); Fung-Ling Nian, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 72 days.

(21) Appl. No.: 14/668,237

(22) Filed: Mar. 25, 2015

(65) Prior Publication Data

US 2016/0281833 A1    Sep. 29, 2016

(51) Int. Cl.
*F16H 35/00* (2006.01)
*F16H 49/00* (2006.01)

(52) U.S. Cl.
CPC ..... *F16H 49/001* (2013.01); *F16H 2049/003* (2013.01)

(58) Field of Classification Search
CPC .................................................. F16H 49/001
USPC ........................................................ 74/640
See application file for complete search history.

(56) References Cited

U.S. PATENT DOCUMENTS

| | | | |
|---|---|---|---|
| 7,328,632 B2* | 2/2008 | Ishikawa | F16H 55/0833 74/640 |
| 7,735,396 B2* | 6/2010 | Ishikawa | F16H 55/0833 74/462 |
| 7,836,786 B2* | 11/2010 | Zhang | F16H 49/001 74/461 |
| 8,661,940 B2* | 3/2014 | Ishikawa | F16H 55/0833 74/640 |

FOREIGN PATENT DOCUMENTS

JP    6-19872    5/1994

* cited by examiner

*Primary Examiner* — Ha D Ho
(74) *Attorney, Agent, or Firm* — Muncy, Geissley, Olds & Lowe, P.C.

(57) ABSTRACT

A harmonic drive includes a rigid internal gear, a flexible external gear meshed with the rigid internal gear, and a wave generator abutted against the flexible external gear. Through a special parameter setting to design the outer peripheral edge of the wave generator in a surface of variable curvature, the contact area between the wave generator and the flexible external gear is increased to improve fretting wear, thereby enhancing transmission accuracy and reducing hysteresis error.

6 Claims, 5 Drawing Sheets

HARMONIC DRIVE THAT IMPROVES TRANSMISSION ACCURACY

BACKGROUND OF THE INVENTION

1. Field of the Invention

The present invention relates to speed reducing gear technology, and more particularly, to a harmonic drive that improves transmission accuracy.

2. Description of the Related Art

Harmonic drive is a high ratio of gear reducer. A conventional harmonic drive generally comprises a rigid internal gear, a flexible external gear rotatably mounted within the rigid internal gear, and a wave generator rotatably mounted within the flexible external gear. After installation of the wave generator in the flexible external gear, the flexible external gear is pushed by the outer perimeter of the wave generator and elastically deformed to provide an elliptical shape. Thus, when the wave generator is driven to rotate by a power source, the rigid internal gear and the flexible external gear are forced to mesh with each other in the major axis of the wave generator and to disengage from each other in the minor axis of the wave generator. Due to a difference in the number of teeth between the rigid internal gear and the flexible external gear, a high speed reduction ratio will be achieved to provide a high torque output when the wave generator is been continuously rotated.

However, because the flexible external gear will become oval in shape after it is inserted into the wave generator, a fretting wear problem will occur during power transmission through the inner perimeter of the flexible external gear, and the transmission accuracy will be affected after a long use. In order to eliminate this problem, Japan Utility Model Pub. No. 6-19872 teaches a measure of processing a recessed portion out of the outer peripheral edge of the axle bearing of the wave generator, wherein the recessed portion and a width of the flexible external gear exhibit a predetermined ratio so that the thrust force produced during installation of the flexible external gear can be reduced, thereby reducing fretting wear. However, in actual application, the effect of improvement of this measure is limited.

SUMMARY OF THE INVENTION

The present invention has been accomplished under the circumstances in view. It is the main object of the present invention to provide a harmonic drive, which effectively improves fretting wear resistance and transmission accuracy.

To achieve this and other objects of the present invention, a harmonic drive comprises a rigid internal gear, a flexible external gear rotatably mounted within the rigid internal gear, and a wave generator rotatably mounted within the flexible external gear. The wave generator comprises an axle bearing and an elliptic wheel mounted in the axle bearing. The axle bearing comprises an outer peripheral edge abutted against an inner perimeter of the flexible external gear. The radius of curvature of the outer peripheral edge in the YZ plane is defined as $R_{GX}$, $R_{GX} = \sqrt{y_x^2 + z_x^2}$. The relationship between $y_x$ and $z_x$ satisfies the ellipse parametric equation of:

$$y_x = \{a_x + ca_x \times (\sin(4\theta - (\pi/2)) + 1)\} \times \sin\theta, 0 \leq \theta \leq 2\pi$$

$$z_x = \{b_x + cb_x \times (\sin(4\theta - (\pi/2)) + 1)\} \times \cos\theta, 0 \leq \theta \leq 2\pi$$

wherein $a_x$ is the semi-major axis of the outer peripheral edge of the axle bearing of the wave generator in the YZ plane before insertion of the elliptic wheel; $ca_x$ is the semi-major axis correction factor; $b_x$ is the semi-minor axis of the outer peripheral edge of the axle bearing of the wave generator in the YZ plane before insertion of the elliptic wheel; $cb_x$ is the semi-minor axis correction factor; $\theta$ is a centrifugal angle of the outer peripheral edge of the wave generator in the YZ plane.

Preferably, the radius of curvature of the outer peripheral edge of the wave generator in a XY plane is defined as $R_{GZ}$, $R_{GZ} = \sqrt{x_z^2 + y_z^2}$, wherein the relationship between $x_z$ and $y_z$ satisfies the following ellipse parametric equation of:

$$x_z = \{a_z + ca_z \times (\sin(4\Psi - (\pi/2)) + 1)\} \times \sin\Psi, 0 \leq \Psi \leq 2\pi$$

$$y_z = \{b_z + cb_z \times (\sin(4\Psi - (\pi/2)) + 1)\} \times \cos\Psi, 0 \leq \Psi \leq 2\pi$$

in which, $a_z$ is the semi-major axis of the outer peripheral edge of the axle bearing of the wave generator in the XY plane; $ca_z$ is the semi-major axis correction factor; $b_z$ is the semi-minor axis of the outer peripheral edge of the axle bearing of the wave generator in the XY plane; $cb_z$ is the semi-minor axis correction factor; $\psi$ is a centrifugal angle of the outer peripheral edge of the wave generator.

Thus, after correction through the aforesaid parametric equation, the curvature of the outer peripheral edge of the wave generator of the harmonic drive will be changed into an arc shape, so that the contact area between the wave generator and the flexible external gear can be increased to improve fretting wear resistance and transmission accuracy.

Other advantages and features of the present invention will be fully understood by reference to the following specification in conjunction with the accompanying drawings, in which like reference signs denote like components of structure.

DETAILED DESCRIPTION OF THE INVENTION

Figure 1:
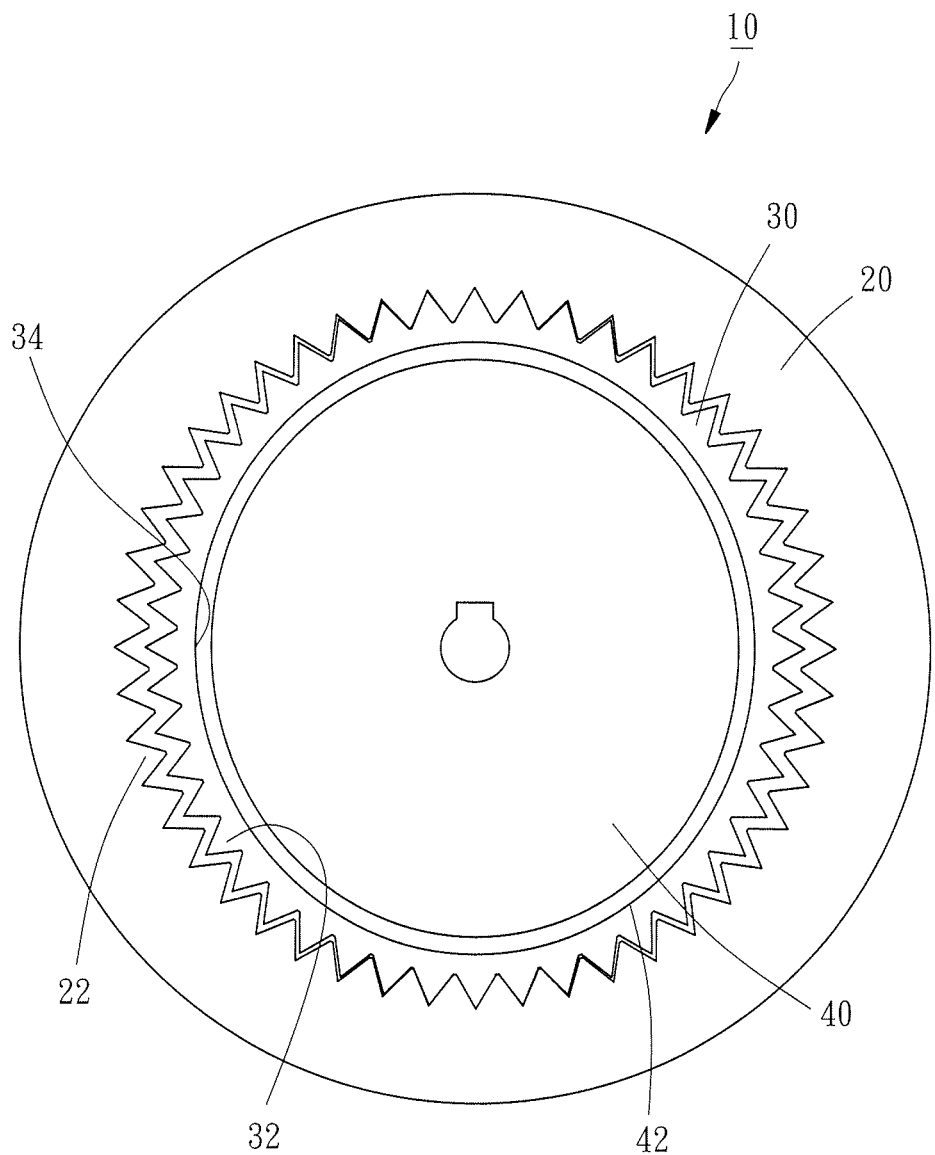
FIG. 1 is a schematic structural view of a harmonic drive in accordance with the present invention.

Referring to FIG. 1, a harmonic drive 10 in accordance with the present invention comprises a rigid internal gear 20, a flexible external gear 30, and a wave generator 40.

The rigid internal gear 20 comprises an inner annular toothed portion 22. The flexible external gear 30 is mounted within the rigid internal gear 20, comprising an outer annular toothed portion 32 facing toward the inner annular toothed portion 22 of the rigid internal gear 20. It is to be noted that the number of teeth of the inner annular toothed portion 22 of the rigid internal gear 20 is 2 more than the number of teeth of the outer annular toothed portion 32 of the flexible external gear 30. Further, the rigid internal gear 20 and the flexible external gear 30 have a same modulus therebetween. The modulus referred to therein is the quotient obtained by dividing the gear pitch diameter by the number of teeth.

The wave generator 40 is mounted within the flexible external gear 30, comprising an axle bearing 42 and an elliptic wheel 44. The axle bearing 42 has the outer peripheral edge 46 thereof abutted against the inner perimeter 34 of the flexible external gear 30. The elliptic wheel 44 is mounted in the axle bearing 42. When the elliptic wheel 44 is driven to rotate by a power source (not shown), the axle bearing 42 is synchronously rotated, causing the outer peripheral edge 46 of the axle bearing 42 to push the inner perimeter 34 of the flexible external gear 30 and to further elastically deform the flexible external gear 30, causing the inner annular toothed portion 22 of the rigid internal gear 20 to be completely meshed with the outer annular toothed portion 32 of the flexible external gear 30 in the major axis direction of the wave generator 40 and completely disengaged from the outer annular toothed portion 32 of the flexible external gear 30 in the minor axis direction of the wave generator 40. Thus, the rigid internal gear 20 can be rotated by the flexible external gear 30 to achieve the effect of torque output.

Figure 2:
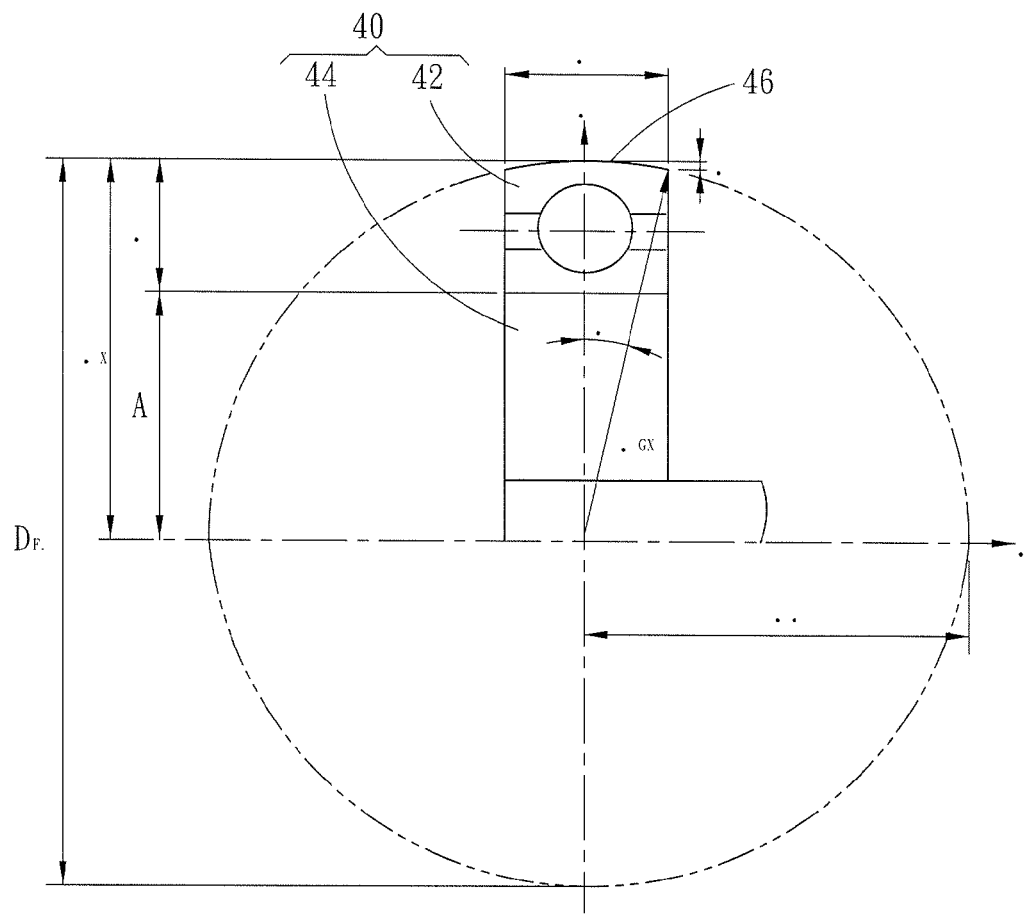
FIG. 2 is a schematic drawing illustrating correction of the curvature of the wave generator in the YZ plane.

In order to increase the contact area between the outer peripheral edge 46 of the axle bearing 42 of the wave generator 40 and the inner perimeter 34 of the flexible external gear 30, the invention makes a correction of the curvature of the outer peripheral edge 46 of the wave generator 40. Referring to FIG. 2, define the radius of curvature of the outer peripheral edge 46 of the wave generator 40 in a YZ plane to be $R_{GX}$, $R_{GX}=\sqrt{y_x^2+z_x^2}$, wherein the relationship between $y_x$ and $z_x$ satisfies the following ellipse parametric equation (I):

$$y_x=\{a_x+ca_x\times(\sin(4\theta-(\pi/2))+1)\}\times\sin\theta, 0\leq\theta\leq2\pi$$

$$z_x=\{b_x+cb_x\times(\sin(4\theta-(\pi/2))+1)\}\times\cos\theta, 0\leq\theta\leq2\pi$$

In the aforesaid ellipse parametric equation (I), $a_x$ is the semi-major axis of the outer peripheral edge 46 of the axle bearing 42 of the wave generator 40 in the YZ plane before insertion of the elliptic wheel 44; $ca_x$ is a semi-major axis correction factor; $b_x$ is the semi-minor axis of the outer peripheral edge 46 of the axle bearing 42 of the wave generator 40 in the YZ plane before insertion of the elliptic wheel 44; $cb_x$ is the semi-minor axis correction factor; $\theta$ is a centrifugal angle of the outer peripheral edge 46 of the wave generator 40.

Figure 3:
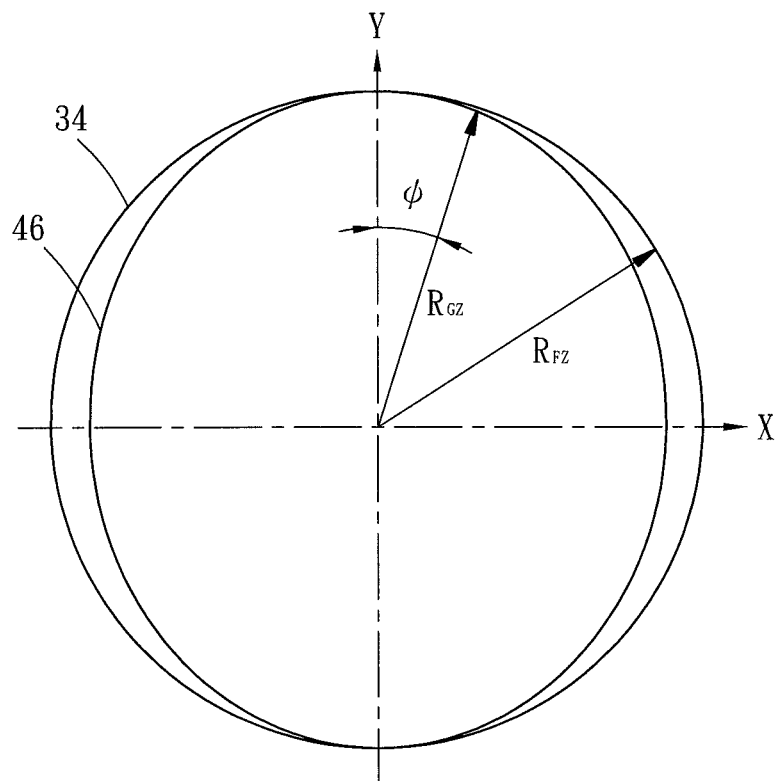
FIG. 3 is a schematic drawing of the present invention, illustrating correction of the curvature of the wave generator in the XY plane.

Thereafter, referring also to FIG. 3, define the radius of curvature of the outer peripheral edge 46 of the wave generator 40 in a XY plane as $R_{GZ}$, $R_{GZ}=\sqrt{x_z^2+y_z^2}$, wherein the relationship between $x_z$ and $y_z$ satisfies the following ellipse parametric equation (II):

$$x_z=\{a_z+ca_z\times(\sin(4\Psi-(\pi/2))+1)\}\times\sin\Psi, 0\leq\Psi\leq2\pi$$

$$y_z=\{b_z+cb_z\times(\sin(4\Psi-(\pi/2))+1)\}\times\cos\Psi, 0\leq\Psi\leq2\pi$$

In the aforesaid ellipse parametric equation (II), $a_z$ is the semi-major axis of the outer peripheral edge 46 of the axle bearing 42 of the wave generator 40 in the XY plane; $ca_z$ is the semi-major axis correction factor; $b_z$ is the semi-minor axis of the outer peripheral edge 46 of the axle bearing 42 of the wave generator 40 in the XY plane; $cb_z$ is the semi-minor axis correction factor; $\psi$ is a centrifugal angle of the outer peripheral edge 46 of the wave generator 40. In addition to the ellipse parametric equation (II), the radius of curvature $R_{GX}$ of the outer peripheral edge 46 of the wave generator 40 in the YZ plane also needs to satisfy the following conditions: after mounting of the elliptic wheel 44 in the axle bearing 42, the outer peripheral edge 46 of the wave generator 40 exhibits an elliptical shape, and therefore $R_{GX}$ must satisfy the ellipse parametric equation (III):

$$R_{GX}\sin\theta = \frac{W}{2}$$

$$R_{GX}\cos\theta = \frac{D_{FX}}{2} - e$$

$$e = 0.001\times D_{FX} \sim 0.05\times D_{FX}$$

In the aforesaid ellipse parametric equation (III), $R_{GX}$ is the radius of curvature of the outer peripheral edge 46 of the wave generator 40 in the YZ plane; W is the width of the axle bearing 42 of the wave generator 40; $D_{FX}$ is the inner diameter of the flexible external gear 30 before deformation; e is the arc correction factor.

Further, after installation of the elliptic wheel 44 in the axle bearing 42 and before insertion of the wave generator 40 into the elliptic wheel 44, the semi-major axis $a_x$ of the outer peripheral edge 46 in the YZ plane needs to satisfy the equation (II)

$$a_x = \frac{D_{FX}}{2}:$$

and the equation (III) $a_x$=A+T, in which: $D_{FX}$ is the inner diameter of the flexible external gear 30 before deformation; A is the semi-major axis of the elliptic wheel 4; T is the thickness of the axle bearing 42.

Figure 4:
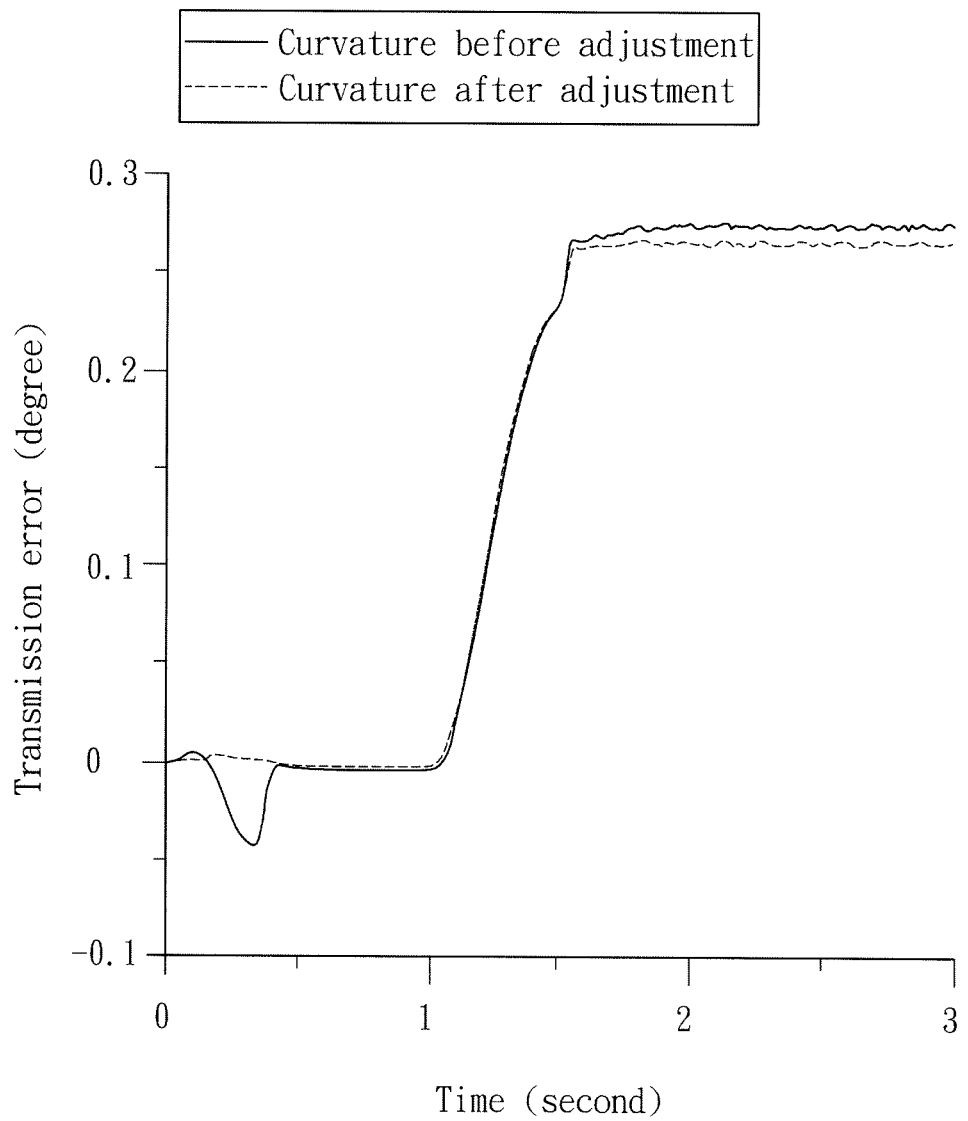
FIG. 4 is a transmission error curve obtained before and after adjustment of the curvature in accordance with the present invention.
Figure 5:
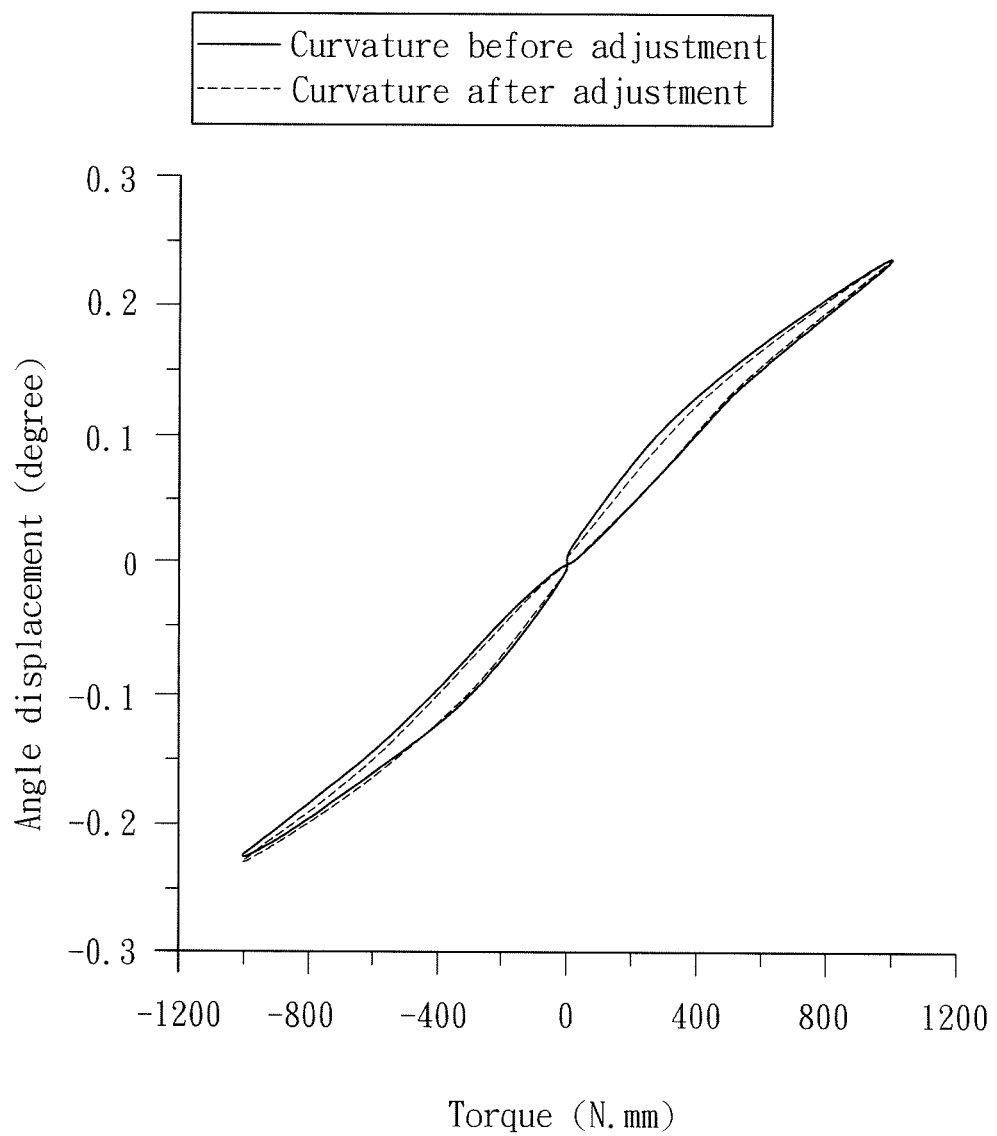
FIG. 5 is a hysteresis error curve obtained before and after adjustment of the curvature in accordance with the present invention.

Thus, through the ellipse parametric equations (I)~(III) and equations (I)~(III), we can obtain the radius of curvature of the wave generator 40 in the YZ plane and the XY plane to be $R_{GX}$ and $R_{GZ}$. Through the relationship between $R_{GX}$ and $R_{GZ}$, the outer peripheral edge 42 of the wave generator 40 can be adjusted to optimize the elliptic curve. After adjustment, the contact area between the wave generator 40 and the flexible external gear 30 is greatly increased, improving the problem of fretting wear produced during power transmission through the wave generator 40. Further, as illustrated in FIG. 4, under the same experimental conditions, the transmission error after adjustment is lowered by 43.61% when compared to that before adjustment; in hysteresis, it shows a reduction by 62.67% when compared to that before adjustment (see FIG. 5 and Table II). Therefore, the invention greatly improves transmission accuracy and reduces hysteresis error after curvature adjustment.

TABLE I

| Transmission error | Maximum (degree) | Minimum (degree) | Range (degree) | Reduce (%) |
|---|---|---|---|---|
| Curvature before adjustment | 0.276591 | 0.271301 | 0.005289 | |
| Curvature after adjustment | 0.266773 | 0.26379 | 0.002983 | 43.61 |

TABLE II

| Hysteresis | Maximum (degree) | Minimum (degree) | Range (degree) | Reduce (%) |
|---|---|---|---|---|
| Curvature before adjustment | 0.0049495 | −0.003408 | 0.008357 | |
| Curvature after adjustment | 0.0014981 | −0.001621 | 0.003119 | 62.67% |

On the other hand, the contact pressure between flexible external gear 30 and the wave generator 40 can be figured out based on the radius of curvature $R_{GX}$ and the $R_{GZ}$. At first, obtain $R_X$ and $R_Z$ respectively from equation (IV)):

$$\frac{1}{R_x} = \frac{1}{R_{Gx}} + \frac{1}{R_{Fx}} = \frac{1}{R_{Gx}} + \frac{1}{\infty} = \frac{1}{R_{Gx}}$$

and equation (V):

$$\frac{1}{R_z} = \frac{1}{R_{Gz}} + \frac{1}{R_{Fz}},$$

in which $R_X$ is the radius of curvature of the outer peripheral edge 46 of the wave generator 40 in the YZ plane before insertion of the elliptic wheel 44; $R_{FX}$ is the radius of curvature of the flexile external gear 30 in the YZ plan; $R_Z$ is the radius of curvature of the outer peripheral edge 46 of the wave generator 40 in the XY plan; $R_{FZ}$ is the radius of curvature of the flexile external gear 30 in the XY plan. Thereafter, obtain the equivalent radius of curvature $$R = \frac{R_x \times R_z}{R_x + R_z}$$

by means of the equation (VI):

$$\frac{1}{R} = \frac{1}{R_x} + \frac{1}{R_z}.$$

Thereafter, use the equivalent Young's modulus E, the approximate complete elliptic integral g, and the ellipse parameter $k_e$ to figure out the major axis of the elliptical contact area to $$bea_e = \left(\frac{6k_e^2 \mathscr{G} W_z R}{\pi E}\right)^{1/3}$$

and the manor axis of the elliptical contact area to $$beb_e = \left(\frac{6\mathscr{G} W_z R}{\pi k_e E}\right)^{1/3}$$

in which the equivalent Young's modulus $$E = \frac{2}{\frac{(1-V_a^2)}{E_a} + \frac{(1-V_b^2)}{E_b}};$$

the approximate complete elliptic integral $$\mathscr{G} = 1.0003 + \frac{0.5968 R_x}{R_z};$$

the ellipse parameter $$k_e = 1.0339 \times \left(\frac{R_z}{R_x}\right)^{0.636}; W_Z$$

is the contact stress acted upon the outer perimeter edge 46 of the wave generator 40 upon engagement between the rigid internal gear 20 and the flexible external gear 30; $V_a$ and $E_a$ are the Poisson's ratio and Young's modulus of the flexible external gear 30; $V_b$ and $E_b$ are the Poisson's ratio and Young's modulus of the wave generator 40. At final, the contact pressure is obtained through the equation (VII):

$$P = \frac{3W_z}{2\pi \times a_e \times b_e}.$$

What is claimed is:

1. A harmonic drive, comprising:
a rigid internal gear;
a flexible external gear rotatably mounted within said rigid internal gear; and
a wave generator rotatably mounted within said flexible external gear, said wave generator comprising an axle bearing and an elliptic wheel mounted in said axle bearing, said axle bearing comprising an outer peripheral edge abutted against an inner perimeter of said flexible external gear, the radius of curvature of said outer peripheral edge in a YZ plane being defined as $R_{GX}$, $R_{GX} = \sqrt{y_x^2 + z_x^2}$, the relationship between $y_x$ and $z_x$ satisfying the ellipse parametric equation of:

$y_x = \{a_x + ca_x \times (\sin(4\theta - (\pi/2)) + 1)\} \times \sin \theta, 0 \le \theta \le 2\pi$ $z_x = \{b_x + cb_x \times (\sin(4\theta - (\pi/2)) + 1)\} \times \cos \theta, 0 \le \theta \le 2\pi$ wherein $a_x$ is the semi-major axis of said outer peripheral edge of said axle bearing of said wave generator in the YZ plane before insertion of said elliptic wheel; $ca_x$ is a semi-major axis correction factor; $b_x$ is the semi-minor axis of said outer peripheral edge of said axle bearing of said wave generator in the YZ plane before insertion of said elliptic wheel; $cb_x$ is the semi-minor axis correction factor; $\theta$ is a centrifugal angle of said outer peripheral edge of said wave generator in the YZ plane.

2. The harmonic drive as claimed in claim 1, wherein before mounting of said elliptic wheel in said axle bearing, the semi-major axis of said outer peripheral edge of said wave generator in the YZ axis and the inner diameter of said flexible external gear establish a relationship of $$a_x = \frac{D_{FX}}{2},$$

in which: $D_{FX}$ is the inner diameter of said flexible external gear before deformation; the semi-major axis of said outer peripheral edge of said wave generator in the YZ plane, the semi-major axis of said elliptic wheel and a thickness of said axle bearing establish a relationship of $a_x = A + T$, in which: $a_x$ is the semi-major axis of said outer peripheral edge of said axle bearing in the YZ plane before insertion of said elliptic wheel; A is the internal radius of said axle bearing; T is the thickness of said axle bearing.

3. The harmonic drive as claimed in claim 2, wherein the radius of curvature of said outer peripheral edge of said wave generator in the YZ plane, a width of said axle bearing of said wave generator, the inner diameter of said flexible external gear before deformation and an arc correction factor establish a relationship of:

$$R_{GX} \sin \theta = \frac{W}{2}$$

$$R_{GX} \cos \theta = \frac{D_{FX}}{2} - e$$

$$e = 0.001 \times D_{FX} \sim 0.05 \times D_{FX}$$

in which, $R_{GX}$ is the radius of curvature of said outer peripheral edge of said wave generator in the YZ plane; W is the width of said axle bearing of said wave generator; $D_{FX}$ is the inner diameter of said flexible external gear before deformation; e is the arc correction factor.

4. The harmonic drive as claimed in claim 1, wherein the radius of curvature of said outer peripheral edge of said wave generator in a XY plane is defined as $R_{GZ}$, $R_{GZ} = \sqrt{x_z^2 + y_z^2}$, the relationship between $x_z$ and $y_z$ satisfying the ellipse parametric equation of:

$$x_z = \{a_z + ca_z \times (\sin(4\Psi - (\pi/2)) + 1)\} \times \sin \Psi, 0 \leq \Psi \leq 2\pi$$

$$y_z = \{b_z + cb_z \times (\sin(4\Psi - (\pi/2)) + 1)\} \times \cos \Psi, 0 \leq \Psi \leq 2\pi$$

in which, $a_z$ is the semi-major axis of said outer peripheral edge of said axle bearing of said wave generator in the XY plane; $ca_z$ is the semi-major axis correction factor; $b_z$ is the semi-minor axis of said outer peripheral edge of said axle bearing of said wave generator in the XY plane; $cb_z$ is the semi-minor axis correction factor; $\psi$ is a centrifugal angle of said outer peripheral edge of said wave generator.

5. The harmonic drive as claimed in claim 4, wherein before mounting of said elliptic wheel in said axle bearing, the semi-major axis of said outer peripheral edge of said wave generator in the YZ axis and the inner diameter of said flexible external gear establish a relationship of $$a_x = \frac{D_{FX}}{2},$$

in which: $D_{FX}$ is me inner diameter of said flexible external gear before deformation; the semi-major axis of said outer peripheral edge of said wave generator in the YZ plane, the semi-major axis of said elliptic wheel and a thickness of said axle bearing establish a relationship of $a_x = A + T$, in which: $a_x$ is the semi-major axis of said outer peripheral edge of said axle bearing in the YZ plane before insertion of said elliptic wheel; A is the internal radius of said axle bearing; T is the thickness of said axle bearing.

6. The harmonic drive as claimed in claim 5, wherein the radius of curvature of said outer peripheral edge of said wave generator in the YZ plane, a width of said axle bearing of said wave generator, the inner diameter of said flexible external gear before deformation and an arc correction factor establish a relationship of:

$$R_{GX} \sin \theta = \frac{W}{2}$$

$$R_{GX} \cos \theta = \frac{D_{FX}}{2} - e$$

$$e = 0.001 \times D_{FX} \sim 0.05 \times D_{FX}$$

in which, $R_{GX}$ is the radius of curvature of said outer peripheral edge of said wave generator in the YZ plane; W is the width of said axle bearing of said wave generator; $D_{FX}$ is the inner diameter of said flexible external gear before deformation; e is the arc correction factor.

* * * * *